Patented Jan. 31, 1939

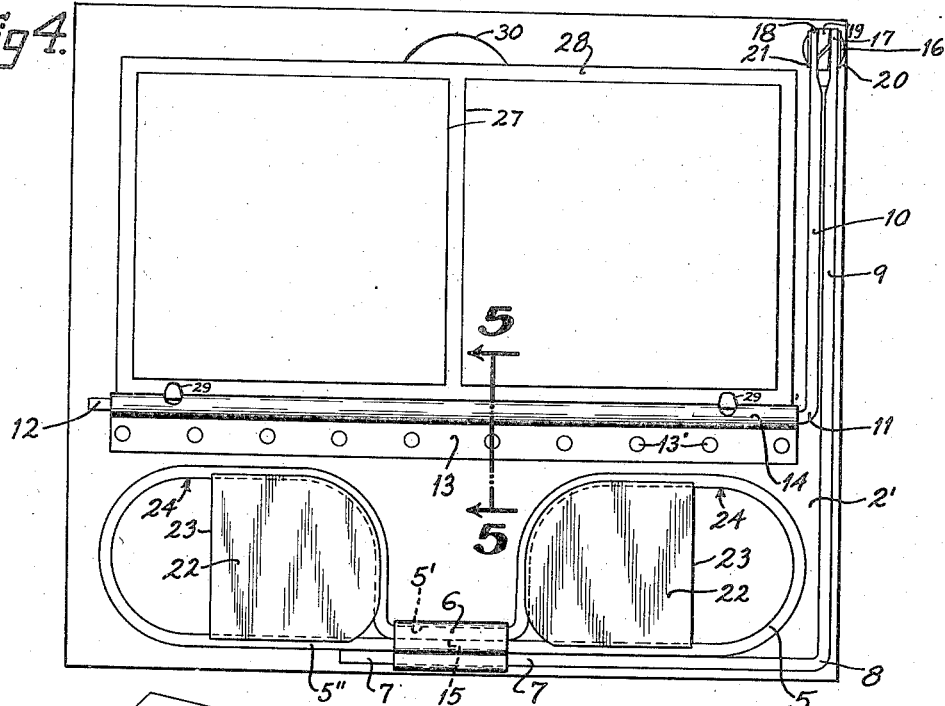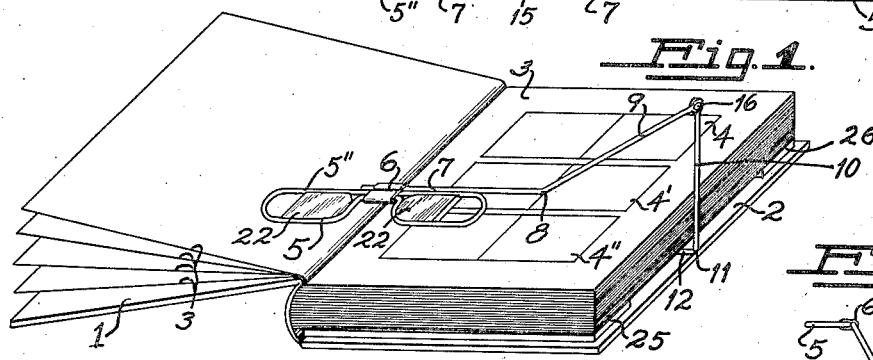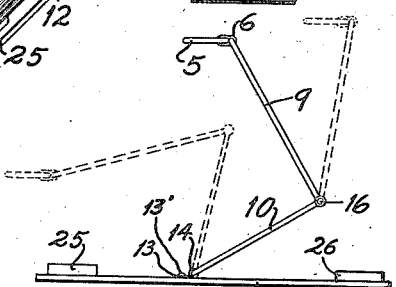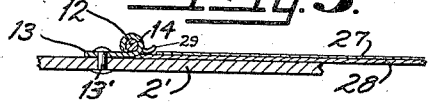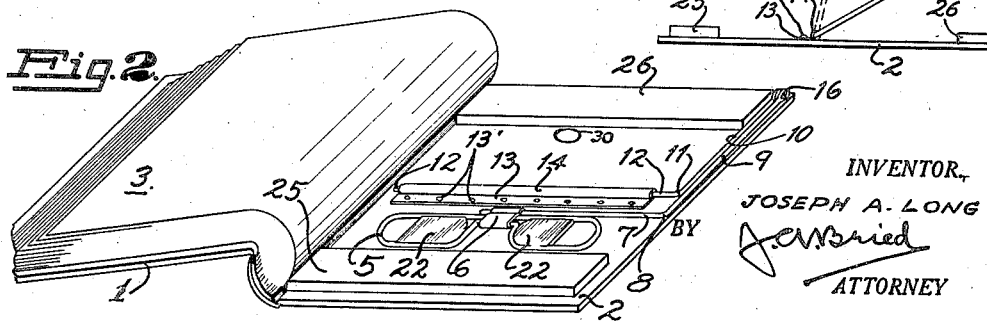

2,145,423

UNITED STATES PATENT OFFICE 2,145,423

FOLDING STEREOSCOPE

Joseph A. Long, Berkeley, Calif.

Application June 7, 1937, Serial No. 146,728

9 Claims. (Cl. 88—30)

This invention relates to folding stereoscopes and has for its principal object a simple, inexpensive device of this kind which will fold substantially flat against a piece of card board or base plate, yet may be easily unfolded and permit focussing to suit the eyes of the user.

Another object of the invention is to provide such a folding stereoscope which will provide for adjusting the lenses to suit varying separations of eyes.

Another object is to provide such a stereoscope which will fold into the cover of a book, yet unfold to extend above the leaves of the book for viewing stereoscopic pictures mounted or printed on the leaves.

Another object is to provide adjustment of parts for aligning and focussing of any of several sets of stereoscopic pictures on different portions of the leaves of the book.

Still another object is to provide such a folding stereoscope which will be adapted to align and hold separate stereoscopic prints in place which are not mounted on the pages of the book.

Other features and advantages of the construction will appear in the following description and accompanying drawing.

In the drawing:

Figure 1 is a perspective view of my folding stereoscope applied to a book of stereoscopic views and outfolded over the pages thereof.

Figure 2 is a perspective view showing the book with all the leaves turned over and the stereoscope folded flat against the rear cover.

Figure 3 is a side elevation of the supporting base or rear cover of the book showing the various positions of the lenses of the apparatus when outfolded.

Figure 4 is a substantially full size plan view of the stereoscope as folded flat against the rear cover or a piece of cardboard and with a stereoscopic picture in aligned position.

Figure 5 is a cross section taken along the line 5—5 of Figure 4.

Briefly described my improved folding stereoscope may be said to be a wire frame in the form of a pair of spectacles fitted with a pair of lenses, and mounted on a pair of frictionally jointed arms supported on a base plate such as the rear cover of a book in a manner to fold flat against the support or extend upward above it, and adjustable thereover to any point and to any distance for proper focussing the pictures, while maintaining the lenses parallel to the base plate. The friction joints firmly hold the device in any desired position of adjustment.

In the drawing Figures 1 and 2 show the device applied to an album of stereoscopic pictures, while Figures 3 to 5 are more concerned with the details of construction.

In the figures, the album is shown with a front cover 1, stiff rear cover 2, and leaves 3 on each of which are mounted or printed three pairs of stereoscopic prints 4, 4′, 4″.

The folding stereoscope which is secured to the inner side of the rear cover comprises an eyeglass-like wire frame 5 frictionally hinged at 6 by a spring clip, to a wire 7 bent at right angles at 8 to form an arm 9 pivoted at its end to a shorter wire arm 10 in turn bent at right angles at 11 to form an elongated hinge pin 12 which extends through a hinge plate 13, tightly curved around it as at 14 and which plate is secured to the rear cover of the album or other supporting plate 2 as by small rivets 13′ or otherwise.

The hinge plate is of thin resilient metal, preferably spring steel, tightly curled about the wire 12 to form a snug friction joint sufficiently firm to hold the apparatus in an outfolded position for an indefinite length of time, and the same applies to the joint clip 6 which is also of thin spring steel sheet metal tightly curled about the wires which it embraces to form a firm friction joint for adjusting the eyeglass frame 5 to any point around wire 7 as an axis.

It should be noted that spring clamp or clip 6 embraces two straight runs 5′ and 5″ of the eyeglass frame as well as wire 7, and also straddles a free joint at 15 in run 5″ so that the eyeglass frame, though made of a single piece of wire, requires no welding or soldering.

The pivoting together of wire arms 9 and 10 is carried out by means of a friction joint which includes a rivet or screw 16 passing through the two flattened and drilled ends 17, 18 of the wires (or disks welded thereto) interposed by a spring washer 19, and with preferably two very thin steel washers 20, 21, under the heads of the rivets. The joint assembly may be varied by placing the spring washer to either side of the joint, or two such washers may be used.

The wire spectacle frame is fitted with a pair of prismatic lenses 22 which were formed from a large lens cut in half along the line 23 and they are held in place in the frame by shallow grooves formed in their edges and into which the eyeglass frame seats with sufficient resiliency to hold the glasses snugly in place yet permit them to be slid longitudinally within the frame sockets for the distance of the straight run of the wires or to the point 24 designated by the arrow. In the insertion of the lenses into the frame or removal therefrom, the eyeglass frame is merely forcibly withdrawn from wire 7, and the straight runs 5" opened outwardly so as to free the wire from engagement with the shallow groove in the edges of the lenses.

By the simple and inexpensive construction described, the arms 9 and 10 may be outfolded along the outer edges of the album leaves as shown in Figure 1, and the spectacle frame brought to parallel relation with the pictures on any position on the page, also by simple manipulation of the friction joints the spectacle frame may be adjusted at any desired distance from the pictures for proper focus. The adjustment of the lenses in the frame for separation of eyes has been mentioned, and due to the resiliency of the wire frame the lenses are firmly held in any point of adjustment.

In paging the leaves of the book for changing pictures, arm 10 is simply lifted to give the required clearance.

To look at extra stereoscopic prints which are not attached or printed on the leaves, the leaves may all be turned over and any extra pictures may be laid directly on the rear cover 2 aligned against the curved edge 14 of the hinge plate 13.

In fact, my folding stereoscope, while designed particularly to be used in combination with an album for viewing stereoscopic pictures anywhere on the album leaves, and folding flat into the rear cover when not in use, still has advantages simply mounted on a piece of cardboard or other sheet or plate of supporting material for viewing separate stereoscopic pictures placed on the supporting plate as mentioned for the rear cover of the album.

When mounted on the rear album cover it is desirable to provide a couple of spacing strips of thin wood or thick cardboard attached to the cover, as indicated at 25, 26, in Figure 2 to compensate for the thickness of the lenses and folded arms, and which strips virtually form a pocket in the rear cover for the folded device. But if the folding device is merely mounted on a piece of cardboard or base plate 2' as indicated in Figure 4, the spacing strips may be omitted, though their use protects the instrument when folded. In Figure 4 the stereoscopic pictures to be viewed are indicated at 27 as mounted on a card mount 28 which at its lower edge abuts the hinge plate 13 and extends under a pair of small clips 29 projecting from the curved portion 14 of the hinge plate to hold it in place. A finger hole or depression 30 in the base plate (or album cover 2) facilities grasping the upper edge of the mount 28 for placing or removal of the pictures.

In Figure 2 the folded instrument is shown with the spectacle frame extending below wire arm 7, while in Figure 4 it is shown folded adjacent the hinge plate 13 in a somewhat more compact position. When folded against the rear cover of the album the arms 9 and 10 and friction joint 16 all lie adjacent the outer edges of the leaves, but when mounted on a simple base board or plate 2' as in Figure 4, arms 9 and 10 may be duplicated at the left side of the structure to give a little more stability, though with a good grade of steel wire, the single pair of arms at one side as shown is very satisfactory.

Having thus described my improved folding stereoscope and its combination with an album, what I claim is:

1. In combination, a book having a stiff rear cover and stereoscopic pictures on its leaves, a folding stereoscope secured to the rear cover of the book comprising a pair of arms pivoted together at one end each and positioned outward of and adjacent the outer edges of the book, means frictionally pivoting the free end of one of said arms to the rear cover of the book on an axis extending at right angles to the edge of the cover, an eyeglass frame, means frictionally pivoting said eyeglass frame to the free end of the other arm in position to overhang the pages of the book, all in a manner whereby the eyeglass frame and arms may be folded flat against said rear cover, and be outfolded to various positions over the pages of the book, said arms being of a combined length to permit swinging said eyeglass frame out of the path of turning of the leaves of the book.

2. In combination, a book having a stiff rear cover and stereoscopic pictures on its leaves, a folding stereoscope secured to the rear cover of the book comprising a pair of arms pivoted together at one end each and positioned outward of and adjacent the outer edges of the book, means frictionally pivoting the free end of one of said arms to the rear cover of the book on an axis extending at right angles to the edge of the cover, an eyeglass frame, means frictionally pivoting said eyeglass frame to the free end of the other arm in position to overhang the pages of the book, all in a manner whereby the eyeglass frame and arms may be folded flat against said rear cover, and be outfolded to various positions over the pages of the book, said arms being of a combined length to permit swinging said eyeglass frame out of the path of turning of the leaves of the book, the pivotal joint of said arms including means to create friction for holding the arms in any point of pivotal adjustment.

3. In combination, a book having a stiff rear cover and stereoscopic pictures on its leaves, a folding stereoscope secured to the rear cover of the book comprising a pair of arms pivoted together at one end each and positioned outward of and adjacent the outer edges of the book, said arms each provided with an outer portion bent at right angles to the run of the arms and in spaced parallel relation to each other, a hinge plate secured to said rear cover frictionally and pivotally engaging the right angle bent portion of one of said arms, an eyeglass frame, and a hinge plate frictionally and pivotally engaging the right angle bent portion of the other of said arms and said eyeglass frame adapting the eyeglass frame to be swung to various positions about the latter arm.

4. In a structure as set out in claim 1, spacing means on said rear cover compensating for the thickness of said stereoscope when folded thereagainst and forming a pocket in which the eyeglass frame is received.

5. A folding stereoscope comprising a pair of wire arms each bent substantially in L shape, means frictionally pivoting one end of each arm together with the right angle portions extending parallel to each other, a base plate, a hinge plate secured to said base plate and frictionally engaging the right angle extending portion of one of said arms, an eyeglass frame, and means frictionally hinging said eyeglass frame to the right angle extending portion of the other of said arms, all whereby the assembly may be folded flat against said base plate or extended with the eyeglass frame at various positions thereover.

6. In a construction as specified in claim 5, said arms and eyeglass frame being of wire and with the latter in one piece bent substantially to the form of a figure eight to form lens loops, and the hinging of said frame to the right angle extending portion of the arm comprising a sheet metal clip tightly embracing both the frame between lens loops and said extending portion of the arm.

7. A folding stereoscope of the character described comprising an eyeglass frame of wire formed with two elongated loops for the lenses, and a prismatic lens in each loop formed with a groove around its edge in which the wire of the loop is seated, said prismatic lenses arranged with their thin portions adjacent, the loops of the wire frame being longer than the lenses and the lenses being frictionally adjustable along the wire longitudinally of the loops.

8. In a structure as set out in claim 5, spacing means on said base plate compensating for the thickness of said stereoscope when folded thereagainst and forming a pocket in which the eyeglass frame is received.

9. In the construction specified in claim 5, means for aligning stereoscopic prints on said base plate for viewing through said eyeglass frame.

JOSEPH A. LONG.